US012716791B2

(12) United States Patent
Mckelvey et al.

(10) Patent No.: US 12,716,791 B2
(45) Date of Patent: Aug. 25, 2026

(54) SYSTEMS, DEVICES AND METHODS FOR DETECTING AXIAL FORCES ACTING UPON A CONTAINER

(71) Applicant: Smart Skin Technologies Inc., Fredericton (CA)

(72) Inventors: Ian Mckelvey, Fredericton (CA); Jordan Ritchie, Island View (CA); Jonathan Halse, Saint Andrews (CA)

(73) Assignee: Smart Skin Technologies Inc., Fredericton (CA)

( * ) Notice: Subject to any disclaimer, the term of this patent is extended or adjusted under 35 U.S.C. 154(b) by 257 days.

(21) Appl. No.: 18/718,571

(22) PCT Filed: Dec. 9, 2022

(86) PCT No.: PCT/CA2022/051801
§ 371 (c)(1),
(2) Date: Jun. 11, 2024

(87) PCT Pub. No.: WO2023/108261
PCT Pub. Date: Jun. 22, 2023

(65) Prior Publication Data

US 2025/0052625 A1 Feb. 13, 2025

Related U.S. Application Data

(60) Provisional application No. 63/289,365, filed on Dec. 14, 2021.

(51) Int. Cl.

| | |
|---|---|
| ***G01L 1/18*** | (2006.01) |
| ***G01L 5/00*** | (2006.01) |
| ***G01L 25/00*** | (2006.01) |

(52) U.S. Cl.
CPC .................. *G01L 1/18* (2013.01); *G01L 5/00* (2013.01); *G01L 5/0038* (2013.01); *G01L 25/00* (2013.01)

(58) Field of Classification Search
CPC . G01L 1/18; G01L 5/00; G01L 5/0038; G01L 25/00
See application file for complete search history.

(56) References Cited

U.S. PATENT DOCUMENTS

| | | |
|---|---|---|
| 3,771,649 A | 11/1973 | Strauss |
| 4,144,742 A | 3/1979 | Schmidt et al. |

(Continued)

FOREIGN PATENT DOCUMENTS

| | | |
|---|---|---|
| CN | 105628274 A | 6/2016 |

OTHER PUBLICATIONS

Extended European Search Report dated Oct. 24, 2025 in related European Patent Application No. 22905565.2 (6 pages).

(Continued)

*Primary Examiner* — Jonathan M Dunlap

(57) ABSTRACT

Systems, devices and methods for detecting axial forces, including residual forces, resulting from applying a crimp cap to a container are provided. The devices can include a device housing, a closing member, a capping section, a force measurement sensor, and a processing system. The closing member and the capping section can define a flange assembly to which a crimp cap can be attached. The force measurement sensor can be positioned to generate the residual force measurement data in response to an axial force resulting at the flange assembly of the container or at the first end of the closing member. The residual force measurement data can be generated once the external force applied during the capping process has been removed.

20 Claims, 14 Drawing Sheets

(56) References Cited

U.S. PATENT DOCUMENTS

| | | | | |
|---|---|---|---|---|
| 4,306,448 | A | 12/1981 | Rohde | |
| 4,788,850 | A | 12/1988 | Buschor et al. | |
| 4,989,462 | A | 2/1991 | Davis et al. | |
| 5,038,952 | A | 8/1991 | Dorfman | |
| 5,103,682 | A | 4/1992 | Moreland et al. | |
| 6,227,418 | B1 | 5/2001 | Loertscher | |
| 6,615,672 | B2 * | 9/2003 | Stalnaker | G01L 5/0038 73/818 |
| 7,324,864 | B2 | 1/2008 | Barger et al. | |
| 11,326,968 | B2 | 5/2022 | Halse et al. | |
| 11,906,478 | B2 * | 2/2024 | Riddick | G01N 3/08 |
| 2003/0047005 | A1 * | 3/2003 | Stalnaker | G01L 5/0038 73/818 |
| 2007/0084152 | A1 | 4/2007 | Brown | |
| 2010/0147822 | A1 | 6/2010 | Burrows et al. | |
| 2017/0343395 | A1 | 11/2017 | Woernle et al. | |
| 2020/0025636 | A1 | 1/2020 | Caffa et al. | |
| 2021/0093784 | A1 | 4/2021 | Adams et al. | |
| 2021/0339594 | A1 | 11/2021 | Wang et al. | |
| 2021/0346618 | A1 | 11/2021 | Mikosz et al. | |
| 2022/0228957 | A1 * | 7/2022 | Riddick | G01N 3/08 |
| 2022/0236126 | A1 | 7/2022 | Halse et al. | |

OTHER PUBLICATIONS

International Search Report and Written Opinion mailed Feb. 8, 2023 in related International Patent Application No. PCT/CA2022/051801 (9 pages).

International Search Report and Written Opinion mailed Oct. 14, 2021 in related International Patent Application No. PCT/CA2021/050938 (7 pages).

* cited by examiner

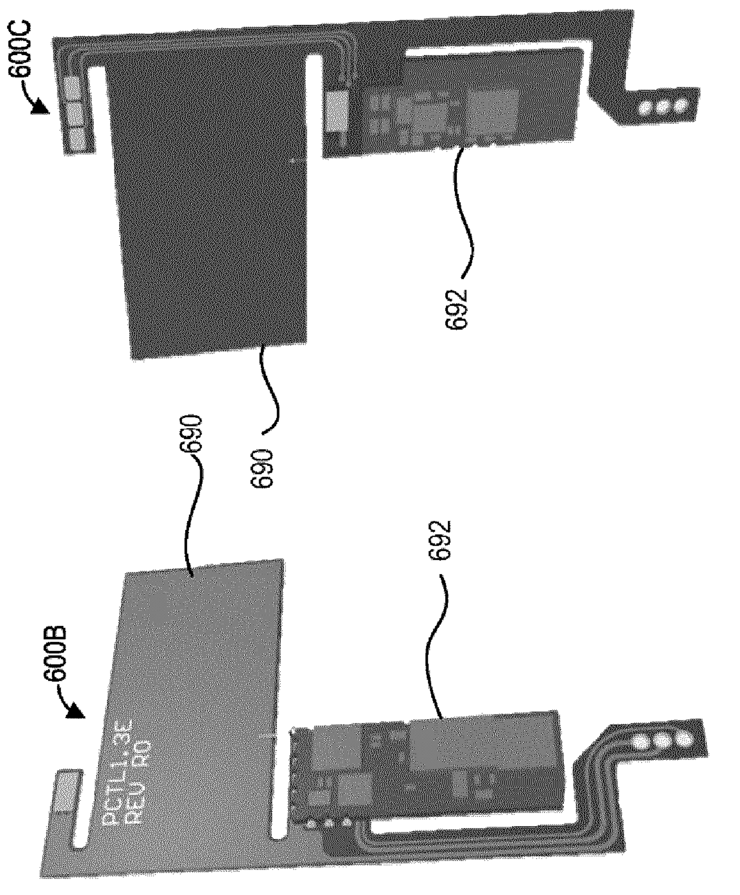
FIG.6C
FIG.6B
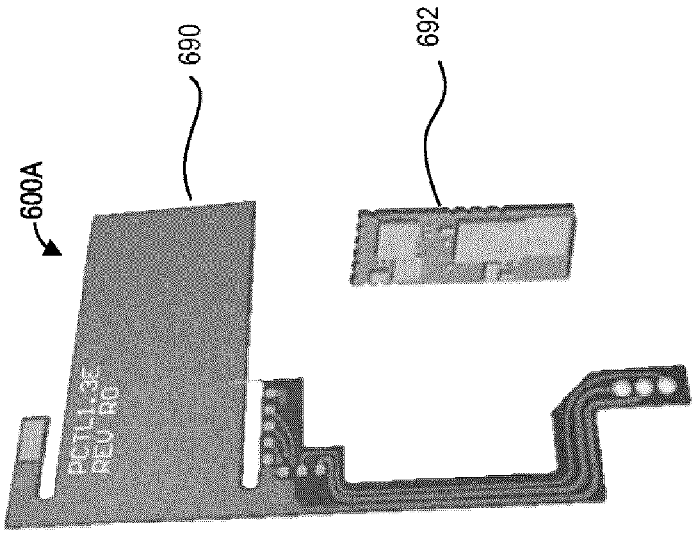
FIG. 6A

SYSTEMS, DEVICES AND METHODS FOR DETECTING AXIAL FORCES ACTING UPON A CONTAINER

FIELD

The embodiments described herein generally relate to detecting forces, and in particular to detecting and measuring axial forces, including residual axial forces, applied to a container.

BACKGROUND

The following is not an admission that anything discussed below is part of the prior art or part of the common general knowledge of a person skilled in the art.

Containers can be used to house a product during distribution, storage, sale, and/or use. A container can provide physical protection for the product stored therein. For example, the container may protect the product from damage that may be caused by mechanical shock, compression, vibration, or other forms of energy transfer. The container may also act as a barrier to heat, oxygen, humidity, dust, bacteria, and/or other undesirables. The container can reduce the risk of degradation or contamination and enhance the shelf life and safety of the product.

At various stages of production, transportation and distribution, the container may be subject to potentially damaging forces. In particular, the container may be subject to forces that may compromise its seal. Each stage in the production line may involve some physical contact (direct or indirect) between the equipment and the container that could potentially result in damage. Similarly, during shipping, the container may experience various physical forces, as the container is physically transported to a destination.

Modern production and transportation processes may be highly optimized to reduce the risk of damage to a container to low levels. However, when damage is detected, it can be difficult to identify the source of the damage along the production and transportation process. Continuing to produce damaged containers can be costly, as the damaged containers may be difficult or impossible to sell. In some cases, damaged containers may also pose a danger to other products or to people or animals, for instance if the product contents are potentially hazardous.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The various embodiments described herein can be used to identify problems in production and transportation process, such as faulty or unreliable equipment that can cause damage to articles. The impact sensing systems described herein may be used to optimize production and transportation processes for a product, by enabling adjustments to line equipment and/or packaging equipment to ensure application of safe forces to a product. The application of safe forces to a product can minimize damage and breakage during the production and transportation processes, which can help maximize production yield. For example, the embodiments described herein can be used for container closure integrity verification.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 6A is a perspective view of an example circuit board that may be used with the axial force measurement devices of FIGS. 2 and 5A, showing the components separated, in accordance with an embodiment;

FIG. 6B is a perspective front view of the example circuit board shown in FIG. 6A, showing the components assembled;

FIG. 6C is a perspective back view of the example circuit board shown in FIG. 6B;

Figure 1:
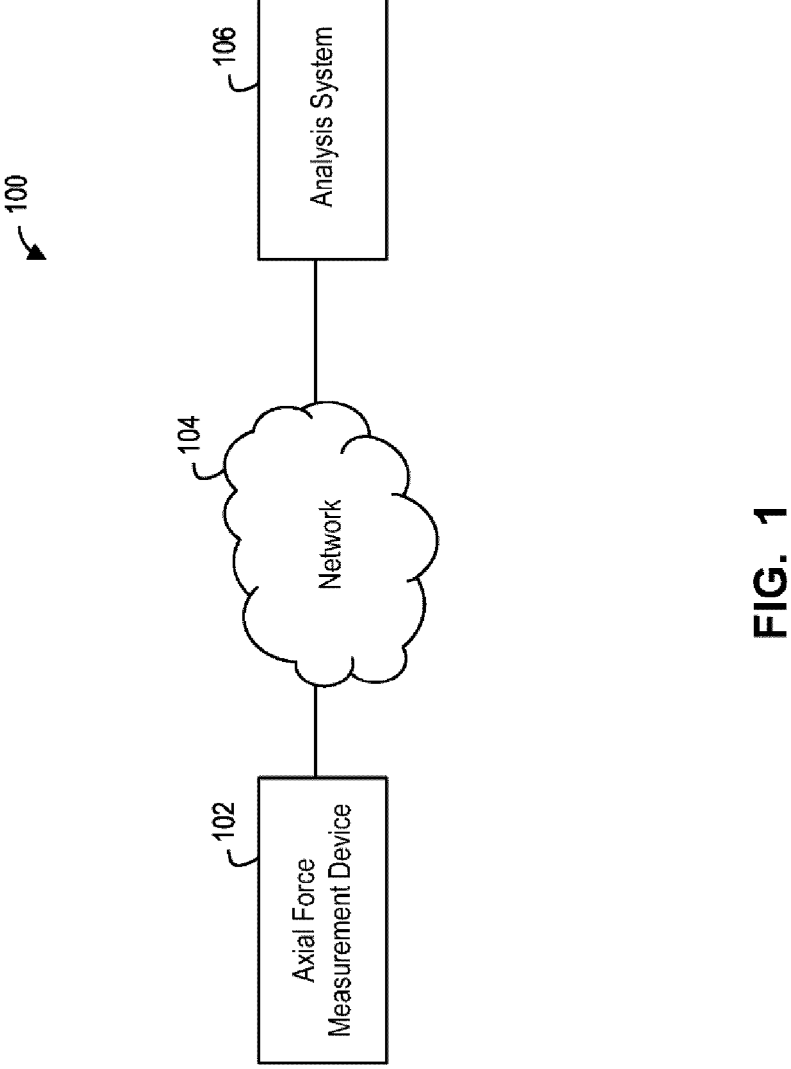
FIG. 1 is a block diagram of an example container monitoring system in accordance with an embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

During a production and transportation process, a container may be subject to a number of forces that can potentially damage the container or portions of the container such as the seal of the container. Depending on the severity of the damage, it may not be possible to sell, or otherwise use, the container, for example, due to regulatory and/or customer requirements. Identifying the source(s) of damage and assessing the severity of damage in the production and transportation process can be crucial in minimizing or preventing damage to container in the future. This can help maximize production yields and minimize lost costs.

It is often difficult to precisely identify the source of damage to a container along the chain of a production and transportation process. The production process for a container can be extremely complex and may include multiple production steps involving various pieces of equipment or machinery. Inspecting each manufacturing step and each corresponding piece of equipment in the production process can be time consuming and may result in costly downtime in the production process. The transportation process for a container may be equally complex, for example, involving multiple different couriers and modes of transport over large geographical areas and extended periods of time.

Identifying and assessing specific types of forces applied to a container during a production and transportation process may aid in the identification and assessment of potential source(s) of damage. The measurement of axial forces applied to a container is often of particular interest. Axial forces can be defined as forces acting generally or primarily along the longitudinal axis of a container. In particular, the detection of axial forces on a closing member of a container may be helpful in identifying problems associated with various aspects of a production and transportation process, including during crimping, sealing or capping.

In many scenarios, even when the crimping, sealing or capping process concludes, the container may be subject to residual axial forces compromising the integrity of the container. Detection and/or monitoring of residual axial forces can help determine if a container has been improperly closed during the capping process. During the capping process, if excessive force is used, the container and/or the cap of the container may damage or break during the capping process itself, or shortly after due to the presence of residual axial forces acting on the container. On the other hand, insufficient force can result in a container being improperly sealed. Further, the detection and/or monitoring of residual forces can help determine if the integrity of the container closure has been compromised along the chain of production or the transportation process.

However, it may be difficult to detect axial forces applied to a container, particularly when the container has a small form factor. For example, it may be difficult to measure axial forces applied to pharmaceutical containers, such as syringes, cartridges, vials, pens, ampules, and the like due to their small size. In particular, small form factor containers may have limited internal volumes for housing sensors and other electronics.

Embodiments described herein provide systems, devices and methods for detecting axial forces, including residual axial forces, acting on a container and in particular, axial forces, including residual axial forces, acting on the container due to a crimping or capping process. As discussed herein, real-time axial forces may result when the container is subject to an aspect of a production and/or transportation process, and residual axial forces may continue to act on the container even after the aspect of the production and/or transportation process concludes. For example, when the container is subject to the crimping or capping process, real-time axial forces may result when an external equipment or machinery acts on the container to cap the container. However, even when the external equipment or machinery is removed, residual axial forces may continue to act on the container. In some cases, excessive residual axial forces may jeopardize the integrity of the container. Detecting and/or monitoring axial forces, including residual axial forces, acting on a container can enable adjustment of the line or packaging equipment to ensure application of safe forces to the container.

The devices described herein may be implemented with actual containers and/or replica containers (also referred to as drones). The devices can be configured to detect and/or monitor axial forces applied to the containers. This may allow a production and/or transportation process to be evaluated and adjusted with minimal disruption to the normal operating process.

In embodiments where the force sensing devices are configured as replica containers, the replica containers can be configured to mimic various properties of an actual container, including, but not limited to, the general shape and form of the container. For example, the device may emulate the form factor of containers that are relatively small in size, such as pharmaceutical containers. The device may be substituted for an actual container and undergo one or more stages of a production and/or transportation process intended for the actual container. The device can measure various axial forces during the production and/or transportation process.

In embodiments described herein, the device includes a device housing section. The device housing can house various electronics that may be usable to measure the axial forces applied to the container section. For example, the device housing may house one or more sensors configured to generate force measurement data in response to axial forces applied to device. The device housing section may be coupled to a capping section configured to receive a closing member.

In some cases, the device housing section and the capping section are manufactured as one-piece. In some other cases, the device housing section and the capping section are manufactured as separate pieces that are coupled together.

In various embodiments disclosed herein, the closing member may be a plunger, a lid, a stopper or any other component that cooperates with the capping section of the device to close the opening of the device. In some cases, the closing member may cooperate with the capping section of the device to seal the opening of the device.

In various cases, mounting the closing member onto the capping section results in a flange assembly being defined. The device disclosed in various embodiments herein may be configured to measure various axial forces that may apply to the resulting flange assembly of the device.

In embodiments described herein, the device may use a relatively small number of sensors to mimic containers with a small form factor, such as pharmaceutical containers. In embodiments described herein, the device can be configured to accurately measure axial forces even with a limited number of sensors. In some examples, the device may include only a single sensor. For instance, the device may include a single load cell or a single strain gauge. In some other examples, the device may include multiple sensors.

Referring now to FIG. 1, there is shown a block diagram of a container monitoring system 100. As shown in the example of FIG. 1, the container monitoring system 100 includes an axial force measurement device 102, an analysis system 106, and a network 104.

The axial force measurement device 102 can be a replica of a container for which axial forces are desired to be measured. The axial force measurement device 102 can mimic various properties of an actual container. For example, the axial force measurement device 102 can have the same or similar shape, size, and/or weight as the actual container. The axial force measurement device 102 may have the same or similar mechanical properties as the actual container, such as, but not limited to, strength, ductility, hardness, impact resistance, or fracture toughness.

Alternately, the axial force measurement device 102 may be a container for which axial forces are desired to be measured. The container can be configured to store a product for storage, transportation, sale etc. The container can be configured to store various different types of products, such as liquid (e.g. medicines, beverages, other types of liquids etc.), or solid (e.g. powders, tablets, cartridges, other types of solids etc.) products for example.

The axial force measurement device 102 can be configured to detect and measure axial forces acting upon a container (or replica). For example, the axial force measurement device 102 can be configured to detect and measure axial forces acting upon a container expected to undergo a production and/or transportation process. The device 102 can be configured to detect both the dynamic and residual axial forces acting upon the container and/or the replica.

In some examples, the device 102 may include a replica of a container of a having a relatively small form factor. For example, the axial force measurement device 102 may be a replica of a pharmaceutical container, such as, but not limited to, a bottle, a vial, a syringe, a cartridge, a vial, a pen, or an ampule. Several different examples of axial force measurement devices 102 having different form factors will be described in greater detail with reference to FIGS. 2, 3, 5, and 7.

The axial force measurement device 102 can be configured to detect axial forces applied to the device 102 and more specifically, portions of the device 102. The axial force measurement device 102 can include one or more sensors. The one or more sensors can produce force measurement data in response to axial forces applied to the device 102 or portions of the device 102.

The axial force measurement device 102 can communicate with an analysis system 106 via the network 104. The network 104 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the axial force measurement device 102 and analysis system 106.

The axial force measurement device 102 can send and receive various data to and from the analysis system 106 via the network 104. For example, the axial force measurement device 102 may transmit data related to axial forces applied to the device 102 to the analysis system 106.

The analysis system 106 may communicate with a plurality of axial force measurement devices 102. In some cases, the analysis system 106 receives raw force measurement data produced from the one or more sensors associated with each device 102. In some other cases, the analysis system 106 receives processed force measurement data from the one or more sensors associated with each device 102. For example, in some cases, device 102 may include a processor and memory storing computer-executable instructions usable to configure the processor to perform various analysis operations.

In some further cases, the analysis system 106 receives a combination of raw and processed data from each device 102. In various embodiments, the data received from the device 102 consists of axial force data. In some cases, the data received from the device 102 is raw data, in which case the analysis system 106 is configured to process the raw data to determine the resulting axial force data. In some other cases, the data received from the device 102 is processed axial force data, in which case the analysis system 106 may either do nothing and relay the received information as is, or further evaluate or process the received data to determine the nature of the axial forces applied to the device 102. In some further cases, the data received from the device 102 is a combination of raw and processed axial force data. Although only one axial force measurement device 102 is shown in FIG. 1 for ease of illustration, the container monitoring system 100 can include any number of axial force measurement devices 102, each operable to sense axial forces applied to that device 102 and communicate with the analysis system 106.

The axial force measurement device 102 may transmit force measurement data (such as, for example, raw and/or processed force measurement data) using a wired or wireless communication interface. Alternately or in addition, the force measurement data and/or processed force measurement data may be stored in a data storage on axial force measurement device 102. The force measurement data may then be retrieved from the axial force measurement device 102 and provided to analysis system 106 using the wired or wireless communication interface. Embodiments of the axial force measurement device 102 which use a wired communication interface may include, for example, a USB port to which a USB connector cable can be connected to transfer raw and/or processed force measurement data. A wireless communication interface may however be particularly advantageous in embodiments where on-demand or real-time transfer of raw and/or processed force measurement data is desired, as a wireless communication interface can allow the measurement data to be transmitted at any time and location along the production and transport line, without removing the axial force measurement device 102 from the production or transport line. Wireless transmission of data can also allow data to be transmitted and received automatically, which can allow data to be retrieved frequently, efficiently and/or with fewer resources when compared to wired transmission, which requires the use of one or more cables and can require the intervention of an operator for connecting the cable(s). The analysis system 106 may then process or evaluate the raw force measurement data and/or processed force measurement data to determine various characteristics of the axial forces.

The analysis system 106 can perform various processing on the data received from the axial force measurement devices 102. In some examples, the analysis system 106 may calibrate the received data based on one or more calibration parameters associated with a particular axial force measurement device 102. In some cases, the analysis system 106 may store the calibration parameters associated with each axial force measurement device 102. For example, the calibration parameters for a particular axial force measurement device 102 may be determined based on an initial calibration assessment of the device 102. The results of the initial calibration assessment may then be used to determine the calibration parameters that can be stored in analysis system 106. Alternately or in addition, the calibration parameters may be stored in memory on the device 102 itself and the force measurement data may be calibrated on and by the device 102.

In some examples, the analysis system 106 may correlate force measurement data with steps or locations along a production and/or transportation process. For instance, the force measurement data may be associated with device location data. The device location data may define a location of the article directly, e.g. using position tracking techniques such as GPS or more local position tracking techniques using RFID signals, Bluetooth, or Wi-Fi. Alternately or in addition, the device location data may include data usable to infer the device location, such as the date and/or time at which the force measurement data was generated. The analysis system 106 can then correlate the device location data and force measurement data to identify portions of the production and/or transport process involving unsafe forces that compromise container closure integrity. In some cases, the analysis system 106 may correlate device location data and force measurement data received in real or near real-time. In some cases, the analysis system 106 may generate aggregate reports and/or visualizations based on data associated with a plurality of different axial force measurement devices 102.

The analysis system 106 may include a processor, a data storage, and a communication interface. The analysis system 106 can include computer-executable instructions stored in the data storage that can be executed by the processor to configure the processor to perform various analysis processes. The analysis system 106 may be provided using various computing devices such as, for example, an electronic tablet device, a personal computer, workstation, server, portable computer, mobile device, personal digital assistant, laptop, smart phone, WAP phone, an interactive television, video display terminals, gaming consoles, and portable electronic devices etc. In some cases, the analysis system 106 can be provided by multiple components over a wide geographic area.

Figure 2:
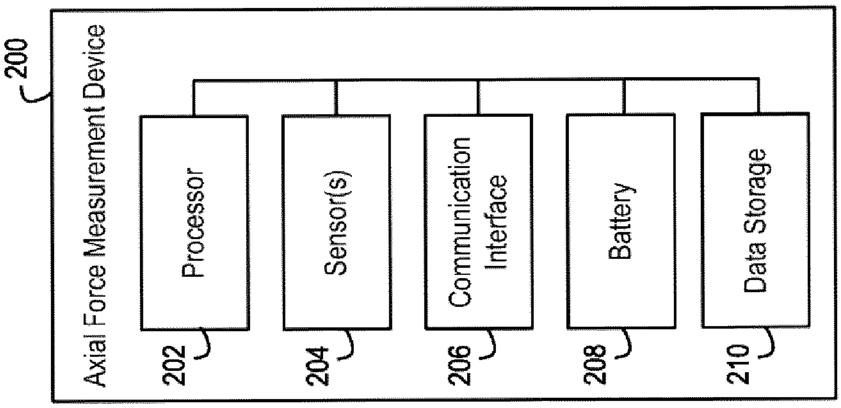
FIG. 2 is a block diagram of an example axial force measurement device in accordance with an embodiment.

Referring now to FIG. 2, there is shown a block diagram of an example axial force measurement device 200. The example axial force measurement device 200 may be used in various force measurement systems, such as an implementation of the axial force measurement device 102 of system 100. As shown in the example of FIG. 2, the axial force measurement device 200 can include a processor 202, one or more sensors 204, a communication interface 206, a battery 208, and a data storage unit 210.

The sensor(s) 204 can include one or more axial force measurement sensors usable to detect and/or measure axial forces applied to the axial force measurement device 200. The axial force measurement sensors can be configured to generate force measurement data in response to axial forces acting upon the axial force measurement device 200. For example, the axial force measurement sensors 204 may include one or more load cells (such as, for example, Honeywell 834M1 series load cells or Futek LLB130 load cells) and/or strain gauges.

In at least one embodiment, at least one axial force measurement sensor 204 is a piezoresistive sensor, such as, for example, a piezoresistive load cell and/or piezoresistive strain gauge. In such embodiments, when axial forces act upon the axial force measurement device 200, the change in resistance caused by the deformation of the one or more piezoresistive sensor can be measured to generate force measurement data. Due to their robustness, durability and ability to resist to shock, vibration and pressure changes, piezoresistive sensors may be particularly suited for use in axial force measurement devices. The durability of piezoresistive sensors can also improve reusability of axial force measurement device 200.

In some cases, the axial force measurement device 200 can include various additional sensor(s) 204. The additional sensors can include different types of sensors (other than axial force measurement sensors) usable to measure other properties of the device 200 and/or environment in which the device 200 is located and/or forces applied to the device. In some examples, the axial force measurement device 200 can include one or more sensors configured to detect and/or measure impact, pressure, acceleration, orientation, location etc. For instance, the axial force measurement device 200 can include an accelerometer configured to detect acceleration of the device 200 and in response, generate acceleration measurement data. In some embodiments the sensor(s) 204 can include gyroscope for measuring the spin of the axial force measurement device 200.

The processor 202 may be any suitable processors, controllers, digital signal processors, or application specific circuitry that can provide sufficient processing power depending on the configuration, purposes and requirements of the axial force measurement device 200. In some embodiments, the processor 202 can include more than one processor with each processor 202 being configured to perform different dedicated tasks.

The processor 202 can be configured to control the operation of the axial force measurement device 200. For example, the processor 202 can control operation of the sensor(s) 204. The processor 202 can also be configured to control communications between the axial force measurement device 200 and external devices, such as the analysis system 106.

In some examples, the processor 202 may be configured to process force measurement data received from the sensor(s) 204. For example, force measurement data may correspond to unprocessed sensor measurements from the sensor(s) 204 and the processor 202 may be configured to receive and process this data to determine an axial force acting upon the device 200. Alternately or in addition, processor 202 may be configured to calibrate the force measurement data (and/or applied axial force) based on one or more calibration parameters for the device 200. For example, calibration parameters may be stored in data storage 210. Processor 202 may use the stored calibration parameters to adjust/calibrate the force measurement data based on the specific parameters of the given device 200.

Alternately, processor 202 may not perform any processing on the received force measurement data. For example, processor 202 may store and/or transmit the force measurement data without any processing and/or adjustments.

In some examples, processor 202 may be configured to store the force measurement data received from the sensor(s) 204 in data storage 210. Processor 202 may store the force measurement data in data storage 210 in an unprocessed form. Alternately or in addition, processor 202 may be configured to store processed force measurement data (e.g. calibrated force measurement data) and/or determined axial force data in data storage 210.

In some examples, processor 202 may be configured to transmit the force measurement data (whether raw, processed or partially processed) to an external analysis system, such as system 106. Processor 202 may transmit the force measurement data to external devices using communication interface 206. Alternately, the processor 202 may simply receive the force measurement data and provide the data to the communication interface 206 in an unprocessed form (i.e. without performing any processing on the received force measurement data). Alternately or in addition, processor 202 may be configured to provide partially processed force measurement data (e.g. calibrated force measurement data) and/or determined axial force data to an external analysis system using communication interface 206.

The communication interface 206 may be any interface that enables the axial force measurement device 200 to communicate with other devices and systems, such as, but not limited to, an analysis system 106 using a network such as the network 104. In some embodiments, the communication interface 206 can include at least one of a serial port, a parallel port or a USB port. The communication interface 206 may also include at least one of an Internet, Local Area Network (LAN), Ethernet, Firewire, modem or digital subscriber line connection. In some embodiments, the communication interface 206 may be a wireless communication interface, which can transmit various data to other devices or systems via Bluetooth, WiFi, or other suitable wireless communication standard. In some cases, the communication interface 206 may be omitted. For example, where the data storage 210 is a removable data storage device, the communication interface 206 may not be needed.

In some embodiments, the communication interface 206 may include a visual indicator, such as, but not limited to, a LED or other light source. The visual indicator can provide a visual representation of the force measurement data. In some cases, the visual indicator provides a visual representation of the determined axial force data. For example, a LED may be configured to emit light when a force detected by the device 200 exceeds a predetermined magnitude. The visual indicator may provide a rapid evaluation of the force measurement data (such as, for example, determined axial force data) to a user, without requiring external transfer of the force measurement data from the device 200. In some cases, the visual indicator may be configured to emit a plurality of different light signals (e.g. different light patterns and/or colors). Each signal may be defined to correspond to a level of force detected by the device (e.g. green for low levels of force, yellow for medium levels of force, and red for high levels of force).

The data storage 210 may store various data, such as, but not limited to force measurement data from the sensors 204. In some cases, the data storage 210 may store calibration data specific to the device 200 that can be used to calibrate the force measurement data. The data storage 210 may also store processed data determined by the processor, such as calibrated force measurement data and/or determined axial force data. The data storage 210 can include RAM, ROM, one or more hard drives, one or more flash drives or some other suitable data storage elements such as disk drives, etc. In some cases, the data storage 210 may be removable from the axial force measurement device 200.

The battery 208 can provide electrical power to various components of the axial force measurement device 200, such as, the processor 202, the sensor(s) 204, the communication interface 206, and the data storage 210. In some cases, the battery 208 may be a rechargeable battery.

Referring now to FIGS. 3A-D, there is shown an example axial force measurement device 300. In the example illustrated in FIGS. 3A-D, the axial force measurement device 300 can be a replica of a container in the form of a pharmaceutical vial.

Figure 3A:
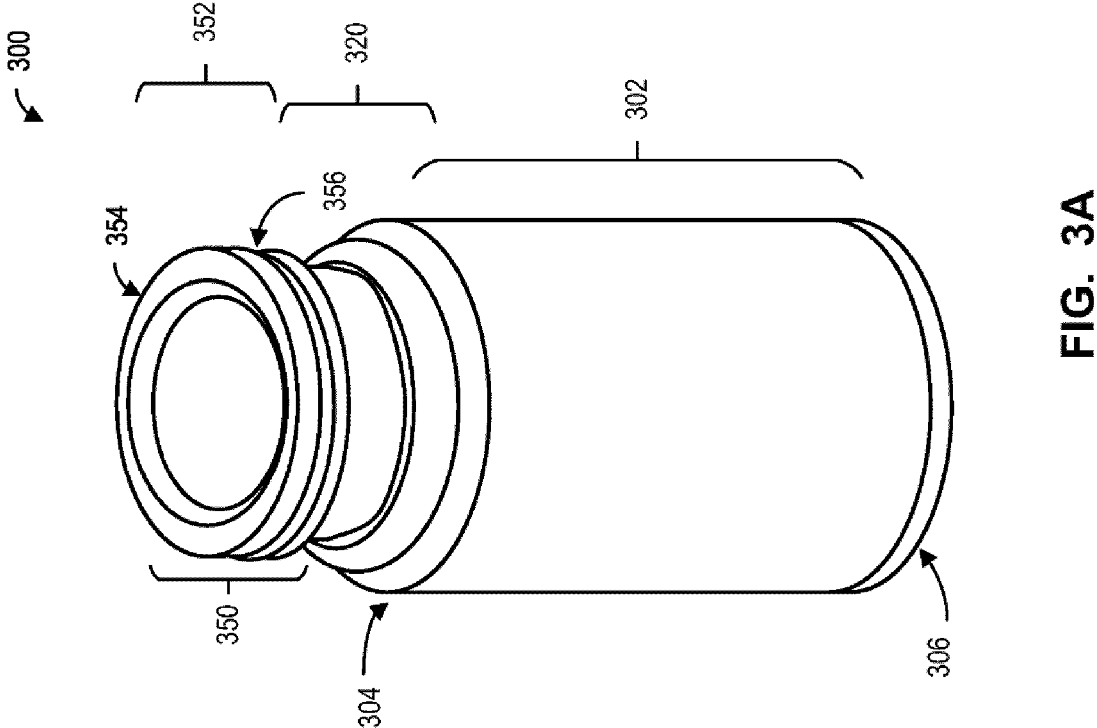
FIG. 3A is a perspective view of an example axial force measurement device in accordance with an embodiment.
Figure 3B:
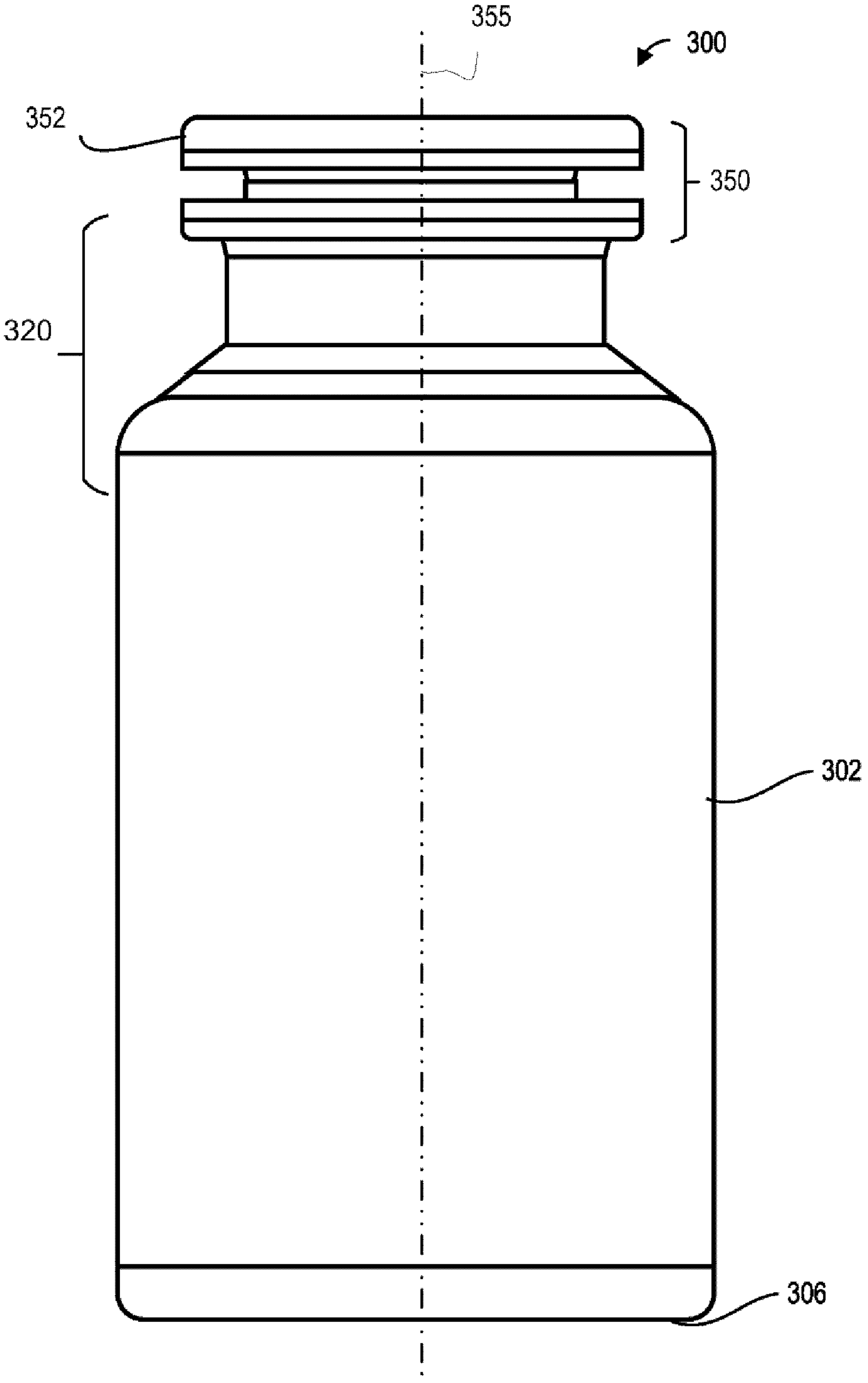
FIG. 3B is a side view of the axial force measurement device shown in FIG. 3A.
Figure 3C:
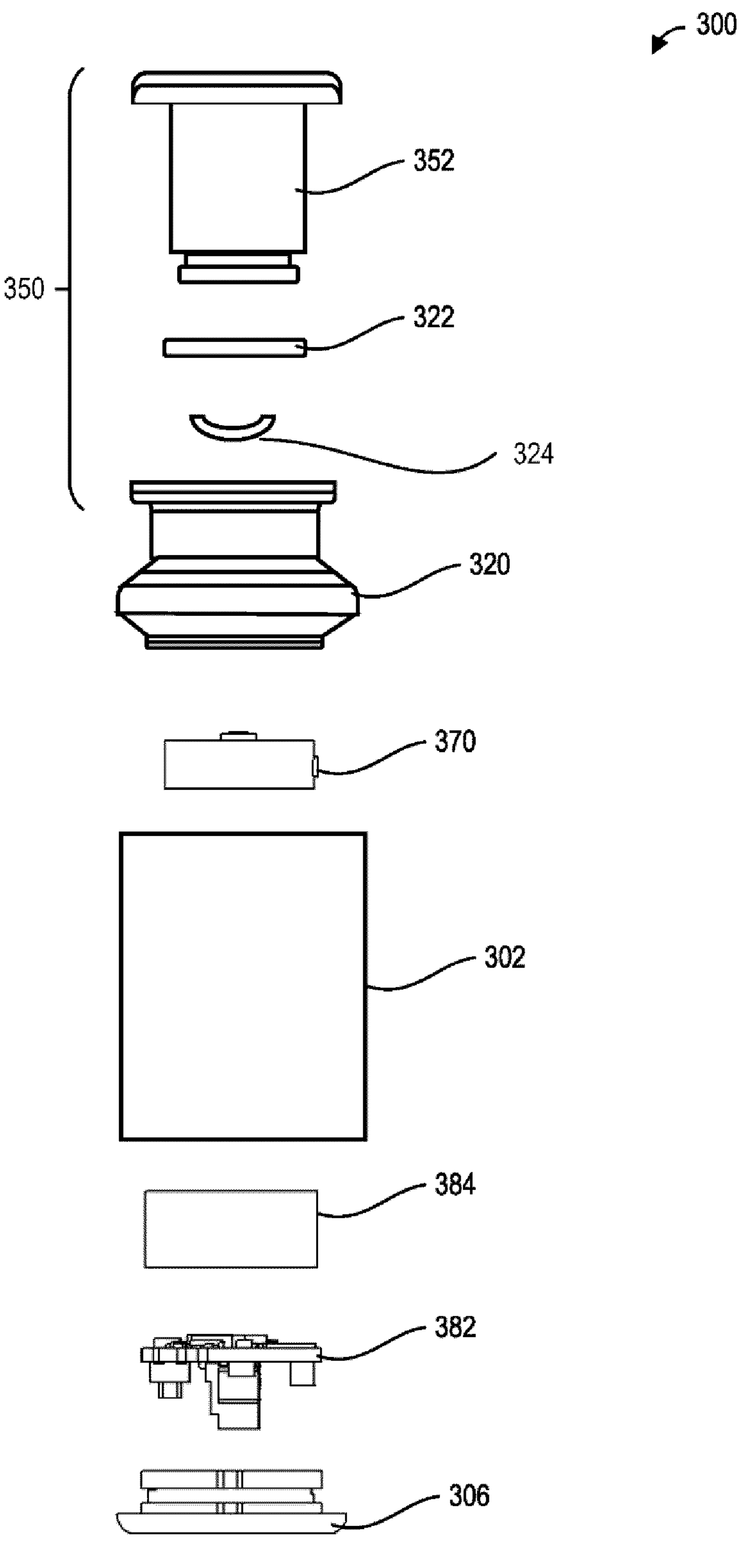
FIG. 3C is an exploded view of the axial force measurement device shown in FIG. 3A.

As shown in FIG. 3A, axial force measurement device 300 can include a device housing section 302, and a flange assembly 350 to which a cap, such as a crimp cap, may be applied. The flange assembly 350 may be defined by the combination of a closing member 352 and a capping section 320. The device housing section 302 can be configured to house force measurement components usable to measure forces applied to the flange assembly 350 of the axial force measurement device 300.

Figure 3D:
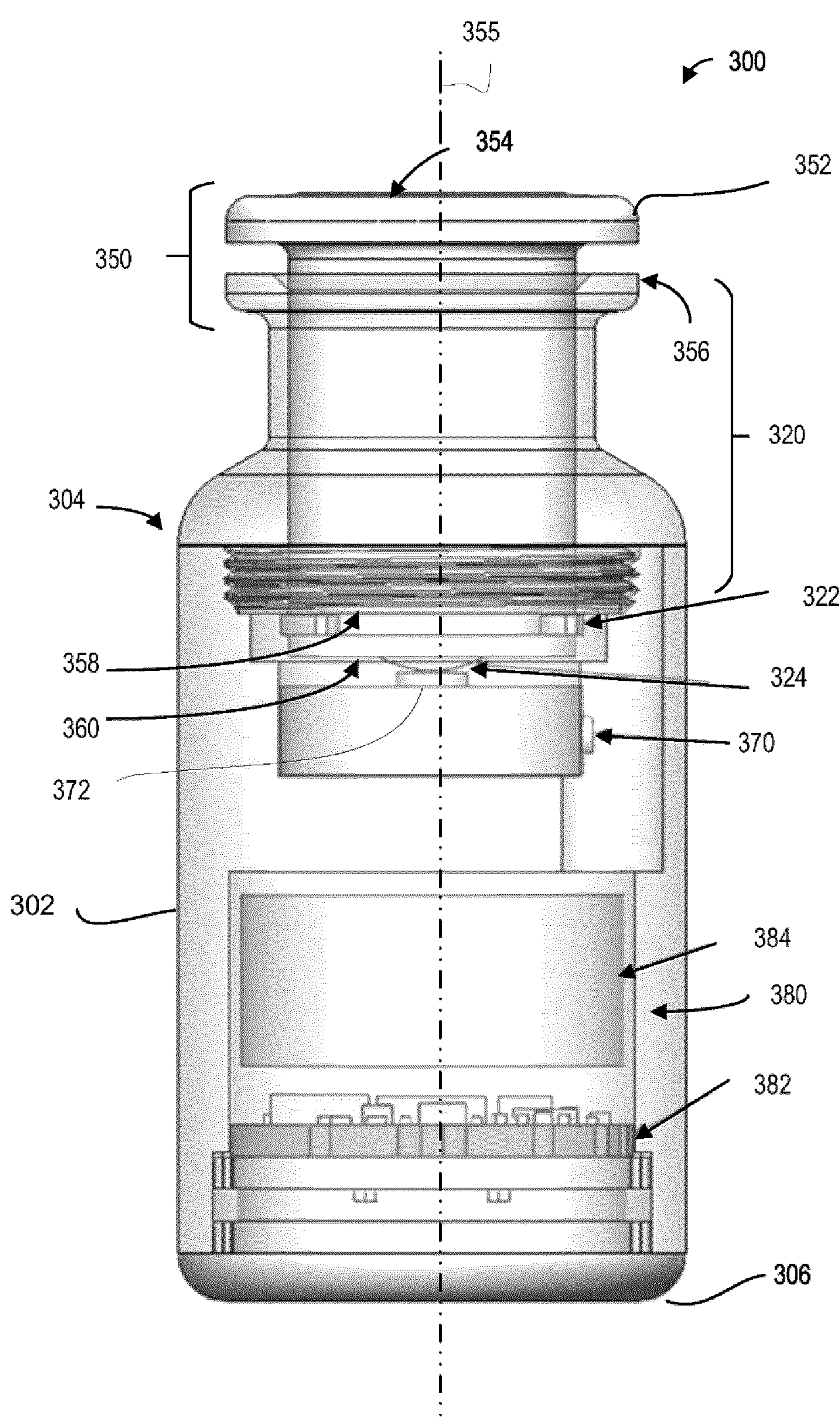
FIG. 3D is a transparent side view of the axial force measurement device shown in FIG. 3A.

As shown in FIGS. 3D, the capping section 320 can extend between a first section end 356 and a second section end 358. The first section end 356 and the second section end 358 can be spaced apart along the longitudinal axis 355 of the device 300. The capping section 320 can include an aperture for receiving the closing member 352.

In some cases, the capping section 320 can be external to the device housing section 302 and can be removably mounted on the device housing section 302 at the second section end 358. In some other cases, the capping section 320 can be connected to the device housing section 302 at the first housing end 304. For example, the capping section 320 and the housing section 302 can be manufactured as a single piece, or can otherwise be assembled to form a single piece.

The closing member 352 can extend between a first end 354 and a second end 360 and can be mounted to the capping section 320 of the axial force measurement device 300 at the first section end 356 of the capping section 320, extending into the capping section 320. In some embodiments, the closing member 352 can extend into the device housing section 302 such that the closing member 352 is partially housed within the device housing section 302.

The closing member 352 can be any type of closing member capable of providing closure to the capping section 320 and capable of interacting with a capping machine to receive a cap such as a crimp cap, and can be referred by terms such as, but not limited to, a plunger, a plug, or a stopper. Alternately, the closing member 352 can include the capping section 320, and such closing member 352 can be mounted to the device housing section 302 proximate the first housing end 304 and can extend into the device housing section 302.

Mounting the closing member 352 onto the capping section 320 results in a flange assembly 350 being defined. The flange assembly can correspond to a portion of the axial force measurement device 300 characterized by a protrusion or a lip extending beyond the sides of the portion of the axial force measurement device 300 immediately adjacent to the flange assembly 350. In some embodiments, the closing member 352 can include the capping section 320 and a flange assembly 350 can be defined by the shape of the closing member 352. During the crimping process, a crimp cap may be crimped onto the flange assembly 350. The flange assembly 350 can be configured to be in direct contact with the capping machine.

In some examples, the capping section 320, the closing member 352, and the device housing section 302 can be concentric. For example, as shown in the example illustrated in FIGS. 3A-D, a portion of the exterior of the closing member 352 can be partially surrounded by capping section 320 alone or by both the capping section 320 and the device housing section 302.

In general, the first end 354 of the closing member 352 and the flange assembly 350 of the device 300 can be subject to various axial forces during various stages of a production and/or transportation process. The device housing section 302 can be configured to house various electronic components that can measure the axial forces applied to the first end 354 of the closing member 352 or to flange assembly 350 of the container. The device housing section 302, the capping section 320 and the closing member 352 can have a relatively small size so that the axial force measurement device 300 can mimic the form factor of a relatively small container, such as a pharmaceutical container. For example, the device housing section 302 may have an inner housing diameter of at most 42.5 mm. In some embodiments, the device housing section 302 may have an inner housing diameter of at most 50 mm.

The axial force measurement device 300 may include a retaining member 322. In some embodiments, the capping section 320 may include the retaining member 322. The retaining member 322 can engage the closing member 352 and prevent movement of the closing member 352 relative to the capping section 320 and/or relative to the device housing section 302. The retaining member 322 can be a sealing member configured to seal the closing member 352 to the capping section 320 and/or the device housing section 302. In some examples, the retaining member 322 may be movably mounted to the capping section 320. Alternately, the closing member 352 can include the retaining member 322 and the retaining member 322 may retain the closing member 352 in position relative to the capping section 320 and/or the device housing section by a friction fit. In some examples, the retaining member 322 may also impede the ingress of fluid into the interior of the device housing section 302. For example, the retaining member 322 may include a gasket, such as an O-ring.

The device housing section 302 can have a first housing end 304 and a second housing end 306. As illustrated the device housing section 302 can extend between the first housing end 304 and the second housing end 306 along a longitudinal 355 axis of the axial force measurement device 300. As in the example illustrated, the device housing section 302 can house a force measurement sensor 370 and a processing system 380.

A spring 324 can be housed within the device housing section 302. The spring may decouple dynamic forces which can allow for measurement of static residual forces in addition to and separate from the dynamic forces applied to the device. The spring can be positioned within the device housing section 302 proximate the closing member 352 such that a second end 360 of the closing member 352 is in contact with the spring 324. The spring can be coupled to the force measurement sensor 370. During a capping or crimping process, the closing member 352 may be urged against the spring 324, such that the spring 324 is compressed against the force measurement sensor 370. After the crimping process is completed, the spring 324 can retain a static deflection and apply a constant force to the force measurement sensor 370, which can be measured by the force measurement sensor 370. The measurement of static residual forces can allow for monitoring of residual forces after the capping or crimping process is completed, which can help determine if the integrity of the container closure has been compromised along the chain of production or the transportation process.

A force measurement sensor 370 and a processing system 380 can be housed within the device housing section 302. For example, the closing member 352, the processing system 380, and the sensor 370 may be arranged linearly within the housing 302. In some cases, the closing member 352, the processing system 380, and the sensor 370 may be substantially aligned along the longitudinal axis 355 of the device 300.

The force measurement sensor 370 can be positioned within the device housing section 302 proximate the spring 324. The force measurement sensor 370 can be positioned to generate force measurement data in response to an axial force acting upon the flange assembly 350 of the device or the first end 354 of the closing member 352.

In some examples, when an axial force is applied at the first end 354 of the closing member 352, for example, when a crimp cap applied to the container, the closing member 352 can be urged to move toward the second housing end 306 along the longitudinal axis 355 and therefore toward the spring 324. The force measurement sensor 370 can be positioned to deflect or deform in response to the motion of spring 324. When the axial force is removed, the spring 324 can retain a static deflection, which can be transmitted to the force measurement sensor 370, which can analogously retain a deflection or deformation. The force measurement sensor 370 can generate the force measurement data in response to such deflections or deformations, including both the deflections and deformations resulting from when the crimp cap is being applied to the container as well as after the crimp cap has been applied to the container. In some cases, the force measurement sensor 370 may be provided by a load cell that includes a button 372 extending towards the spring 324. The button 372 can be positioned so that the button 372 deflects in response to movement of the second end 360 of the closing member 352 toward the second housing end 306.

In some examples, the closing member 352 can be made of a rigid material, such as, but not limited to, a metal or rigid plastic. The rigid material may improve the transfer of axial forces from the closing member 352 to the force measurement sensor 370. The rigid material may also improve the durability of the closing member 352. Alternately, the closing member 352 can be made of a flexible material such as, but not limited to rubber. The flexible material may mimic the behavior of a stopper of a pharmaceutical vial.

The force measurement sensor 370 may alternately be configured to deform in response to axial forces acting upon the first section end 354 or the flange assembly 350. For example, a strain gauge may be used to detect the axial forces, including both the real-time as well as residual axial forces.

The processing system 380 can be positioned within the device housing section 302. The processing system 380 can include one or more components configured to receive force measurement data from the force measurement sensor 370. The processing system 380 can include one or more components configured to perform processing operations on the received data. The processing system 380 can include one or more components configured to transmit the received data and/or processed data. For example, the processing system 380 can include a processor 382 such as processor 202 described herein above. Processor 382 can be configured to receive force measurement data from the force measurement sensor 370. The processing system 380 may also include a battery 384. Battery 384 may be configured to supply electrical power to various components of the processing system 380, such as the processor 382. The various components of the processing system 380 can be arranged in various ways. For example, in some cases, the battery 384 may be positioned between the processor 382 and the force measurement sensor 370.

Figures 4A, 4B:
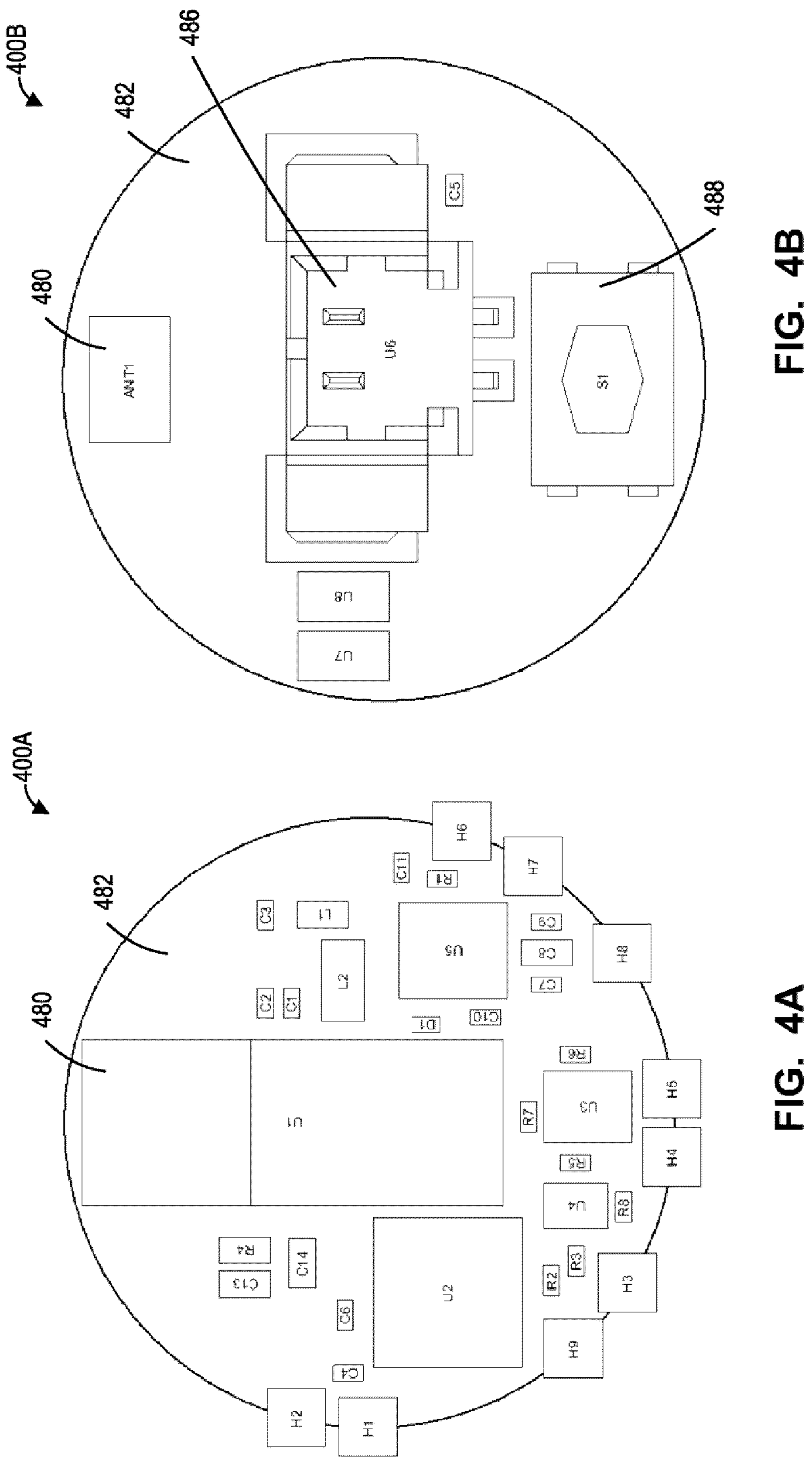
FIG. 4A is a top view of an example circuit board that may be used with the axial force measurement devices of FIGS. 2 and 3A in accordance with an embodiment.
FIG. 4B is a bottom view of the circuit board shown in FIG. 4A.

In some examples, one or more components of the processing system 380 can be implemented using a printed circuit board. For example, FIGS. 4A and 4B show an example printed circuit board 400A, 400B, respectively, that may be used to provide various components of the processing system 380. The printed circuit board 400A can include a substrate 482. The substrate 482 can mechanically support and electrically connect various electrical components within the processing system 380. In some cases, the components can be provided by one or more integrated circuits 480 which are mounted to the substrate 482.

The printed circuit board 400B is analogous to printed circuit board 400A and may include a charging port 486 coupled to a rechargeable battery within the device 300. The charging port 486 can be configured to be coupled to an external power source to recharge the rechargeable battery. The printed circuit board 400B may also include a power activation input usable to activate/deactivate/reset the device 300. For example, a toggle switch 488 may provide the power activation input. Optionally, the printed circuit board 400B may include a visual output device, such as an LED (not shown).

Referring again to FIGS. 3A-D, the force measurement sensor 370 may be spaced apart from the processing system 380. For example, a support member (not shown) may be positioned between the processing system 380 and force measurement sensor 370. The support member can support the sensor 370 adjacent the second end 360 of the closing member 352. The support member can reduce or prevent axial forces from being transferred from the force measurement sensor 370 to the processing system 380. This may provide the advantage of minimizing or preventing damage to the processing system 380.

In some embodiments, the device housing section 302 can include one or more apertures (not shown) proximate the second housing end 306. The aperture(s) can define one or more channels from the exterior of the second housing end 306 into the interior of the device housing section 302. The aperture(s) can provide a user with access to the various components housed within the device housing section 302 that may otherwise be difficult to access. For example, the aperture(s) may facilitate recharging the device 300, and/or accessing or transmitting force measurement data stored on the device, for example, by inserting a cable (e.g. a USB connector cable) to a connector port provided in the device housing section 302. In another example, the aperture(s) may provide access to a switch, such as toggle switch, to activate and/or deactivate the device 300. Alternately or in addition, the aperture(s) may provide a passage or pathway to allow light from a visual indicator to be emitted through the housing 302.

Optionally, the second housing end 306 may be removable from the device housing section 302. Removal of the second housing end 306 may provide greater access to the various components stored internally within the device housing section 302, such as a printed circuit boards 400A, 400B, force measurement sensor 370 etc.

In various embodiments, the second housing end 306 may include an extendable section (not shown) that is configured to adjust the overall longitudinal length of the axial force measurement device 300. The extendable section can extend and retract along the longitudinal axis 355 of the device 300 to adjust the longitudinal length of the device 300. The extendable section may allow the axial force measurement device 300 to imitate the form factor of containers having different longitudinal lengths or heights.

The extendable section can include a fixed portion and an adjustable portion, such as a rotatable portion. The rotatable portion can be rotatably mounted to the fixed portion. For example, the rotatable portion can be configured to rotate about the longitudinal axis 355 of device 300. By rotating the rotatable portion about the longitudinal axis 355, the extendable section can be extended and retracted as desired. In other examples, the adjustable portion may be provided in different manners, for instance as a detachable extender portion.

When the rotatable portion is rotated in a first direction (e.g. clockwise in an example), the extendable section can extend along the longitudinal axis, increasing the longitudinal length of the extendable section. Conversely, when the rotatable portion is rotated in a second direction (e.g. counter-clockwise in this example), the extendable section can retract along the longitudinal axis 355, decreasing the longitudinal length of the extendable section. The fixed portion and the rotatable portion can have corresponding screw threads which convert rotation of the rotatable portion into a linear translation.

Optionally, the extendable section may include a locking member. Locking member can be configured to secure the extendable section at a particular longitudinal length. For example, the locking member may fix or prevent the rotation of the rotatable portion relative to the fixed portion. Fixing the rotation of the rotatable portion can prevent the extension or retraction of the extendable section. For example, the locking member may be provided by a bolt which fixes the rotatable portion relative to the fixed portion.

Referring now to FIGS. 5A-5E, there is shown another example of an axial force measurement device 500. Similar to the example axial force measurement device 300 illustrated in FIGS. 3A-D, the axial force measurement device 500 includes a flange assembly 550 defined by the closing member 552 and the capping section 520, and a device housing section 502. The axial force measurement device 500 also includes a force measurement sensor 570 and a processing system 580 positioned within the device housing section 502.

However, in contrast to device 300, the axial force measurement device 500 has a different shape or form factor as compared to the axial force measurement device 300. In particular, the axial force measurement device 500 is shaped as a syringe. In various embodiments disclosed herein, the axial force measurement device 500 is implemented as a replica of a syringe. In some embodiments, the axial force measurement device 500 is implemented as an actual syringe.

In the example of device 500, the force measurement sensor 570 is provided in the form of a strain gauge 570. In some cases, the strain gauge 570 is a piezoresistive strain gauge. The strain gauge 570 can be configured to generate force measurement data in response to the deformation of a strain element 574. The strain element 574 can be positioned to deform in response to axial forces acting upon a portion of the device 500 corresponding to the flange assembly 550 of the device and/or to axial forces acting upon the first end 554 of the closing member 552. In some examples, the capping section 520 of the device 500 may incorporate the strain element. For example, the capping section 520 may be configured to deform in response to axial forces acting upon the flange assembly 550 or the first end 554. Alternately, the strain element 574 may be provided as a separate component configured to deform in response to axial forces acting upon the flange assembly 550 or the first end 554 of the device 500. In some examples, a portion of the closing member 552 may be in direct contact with the strain element 574.

The capping section 520 may be rigidly mounted such that the capping section is fixed relative to the device housing section 502. Alternatively, the capping section 520 may be external to the device housing section 502 and connected to the device housing section 502 at the first housing end 504. Similar to the axial force measurement device 300, the capping section 520 of the device 500 can include an aperture for receiving the closing member 552.

In the example illustrated in FIGS. 5A-5E, the strain element is provided as a separate strain element 574 proximate the second end 560 of the closing member 552. The strain element 552 can deform in response to axial forces acting upon the closing member 552. In particular, an axial force acting upon the first end 554 of the closing member 552 can cause the closing member 552 to move toward second housing end 506. The strain element 574 can be positioned to deform in response to this motion.

In some embodiments, the strain element 574 can be supported by at least one strain element support member 576. The at least one strain element support member 576 may be fixed to the device housing 502.

In other embodiments, the strain element can be provided by capping section 520. In particular, the capping section 520 can deform in response to axial forces acting upon the closing member 552 and the strain gauge 570 can generate force measurement data in response to the deformation.

In some cases, the strain element 574 may be a replaceable component. The strain element may deteriorate over time as the strain element is repeatedly deformed. The strain element may be removed and replaced by another strain element in the event the original strain element has degraded.

Similar to the axial force measurement device 300, the axial force measurement device 500 may include a retaining member 522. In some embodiments, the capping section 520 may include retaining member 522. The retaining member 522 can engage the closing member 552 and prevent movement of the closing member 552 relative to the capping section 520 and/or the device housing section 502.

Similar to the axial force measurement device 300, the device housing section 502 of device 500 can house a force measurement sensor 570 as described above and a processing system 580.

The processing system 580 can be positioned within the device housing section 502. The processing system 580 can include one or more components configured to receive force measurement data from the force measurement sensor 570. The processing system 580 can include a processor 582 such as processor 202 described herein above. Processor 582 can be configured to receive force measurement data from the force measurement sensor 570. The processing system 580 may also include a battery 584. The battery 584 may be configured to supply electrical power to various components of the processing section 580, such as the processor 582. The battery 584 may be positioned between the processor 582 and the force measurement sensor 570.

Figure 5B:
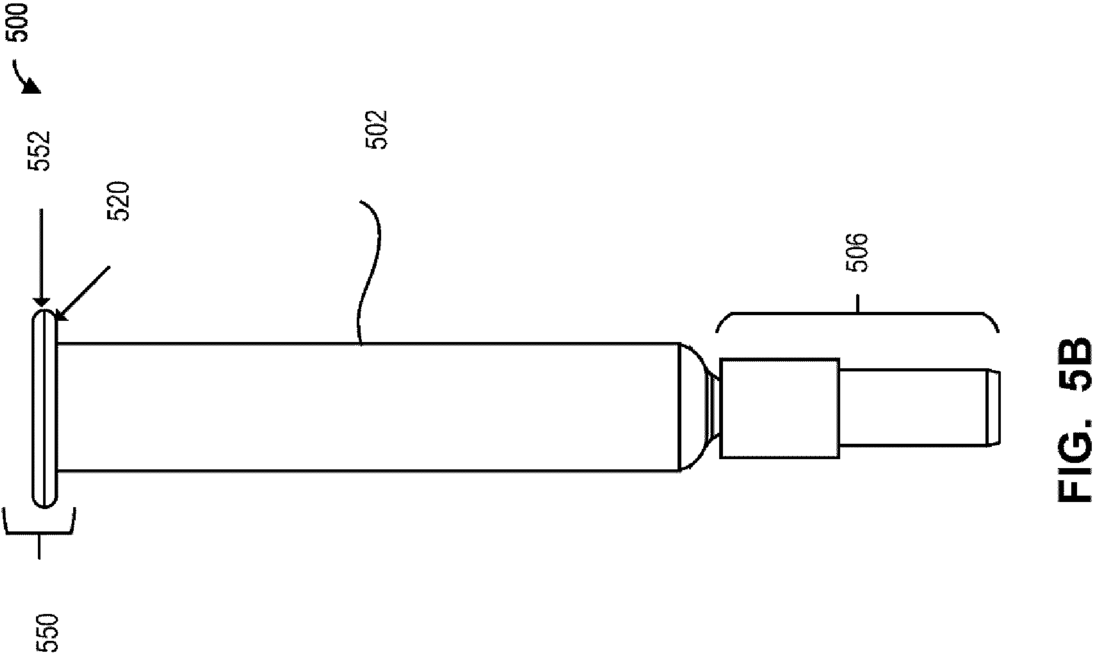
FIG. 5B is a side view of the axial force measurement device shown in 5A.
Figure 5A:
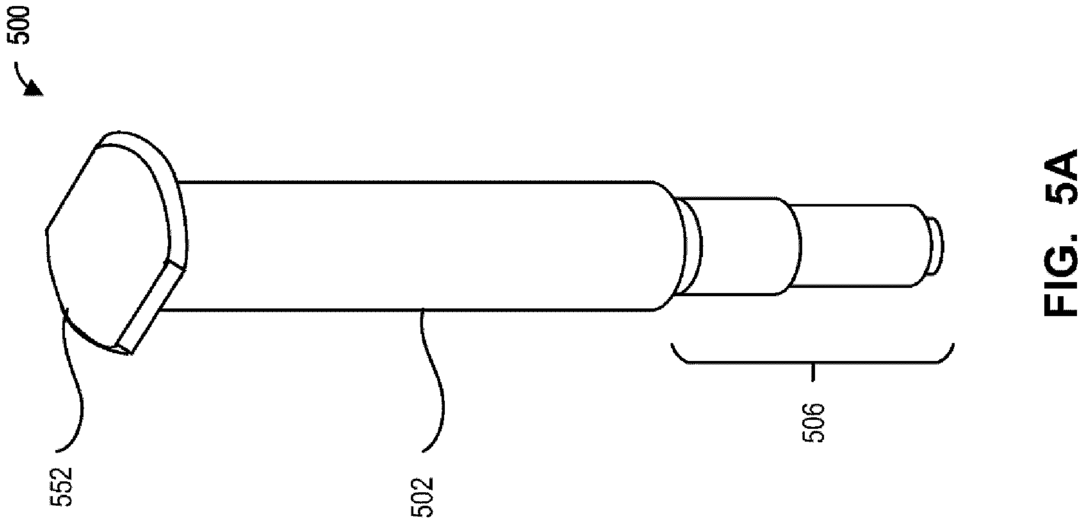
FIG. 5A is a perspective view of another example axial force measurement device in accordance with an embodiment.
Figure 5C:
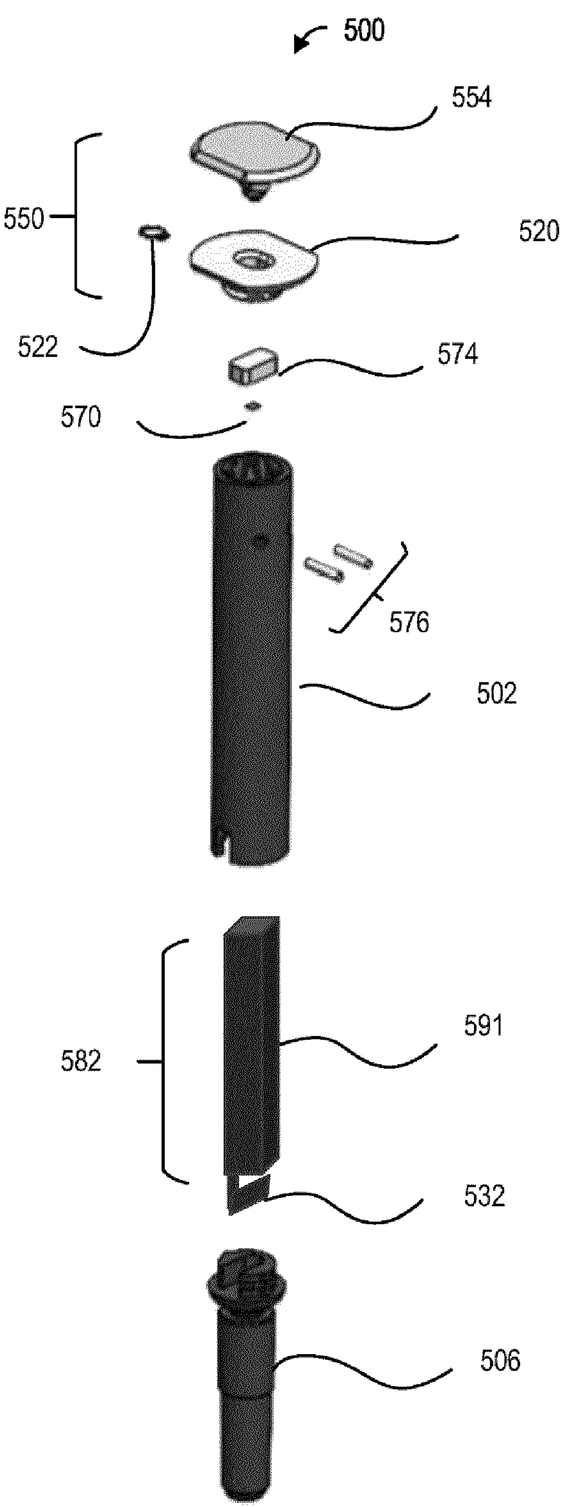
FIG. 5C is an exploded view of the axial force measurement device shown in 5A.
Figure 5D:
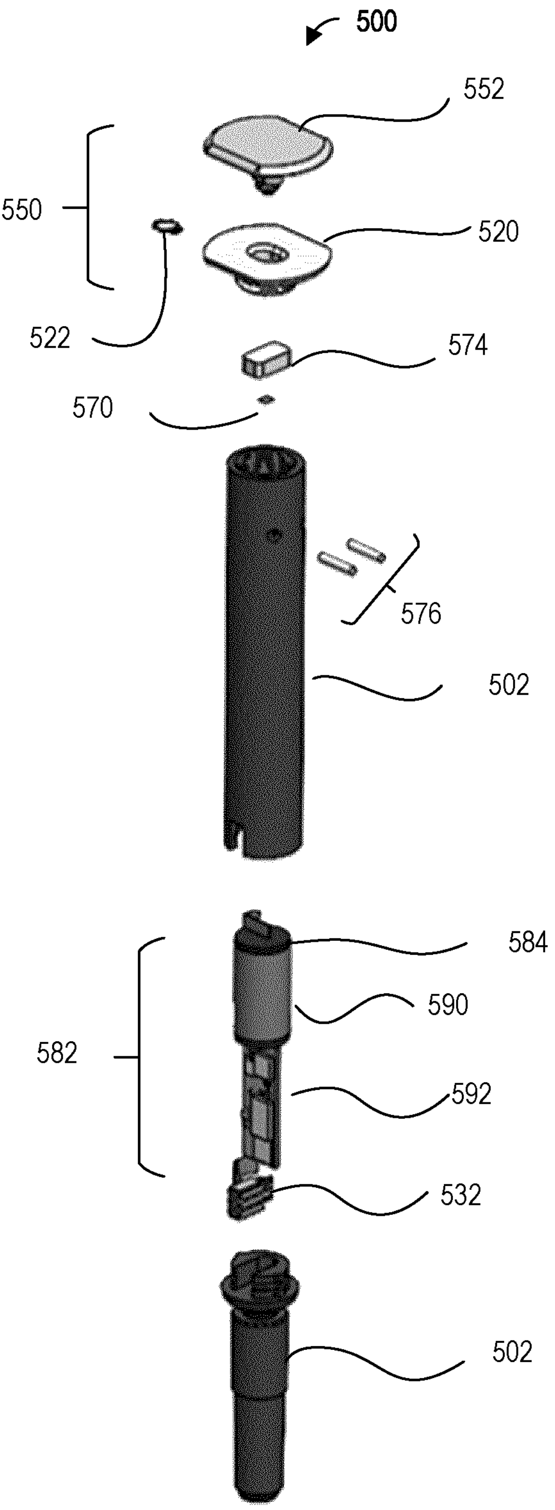
FIG. 5D is an exploded view of an alternate embodiment of the axial force measurement device shown in 5A.

In some examples, one or more components of the processing system 580 can be implemented using one or more printed circuit boards. For example, as shown in FIG. 5C, the processor 582 can be implemented using a circuit board 591. Alternately, as shown in FIG. 5D, the processor 582 can be implemented using a first circuit board 590 and a second circuit board 592. The first circuit board 590 and the second circuit board 592 may be assembled to form a circuit board assembly.

Figure 5E:
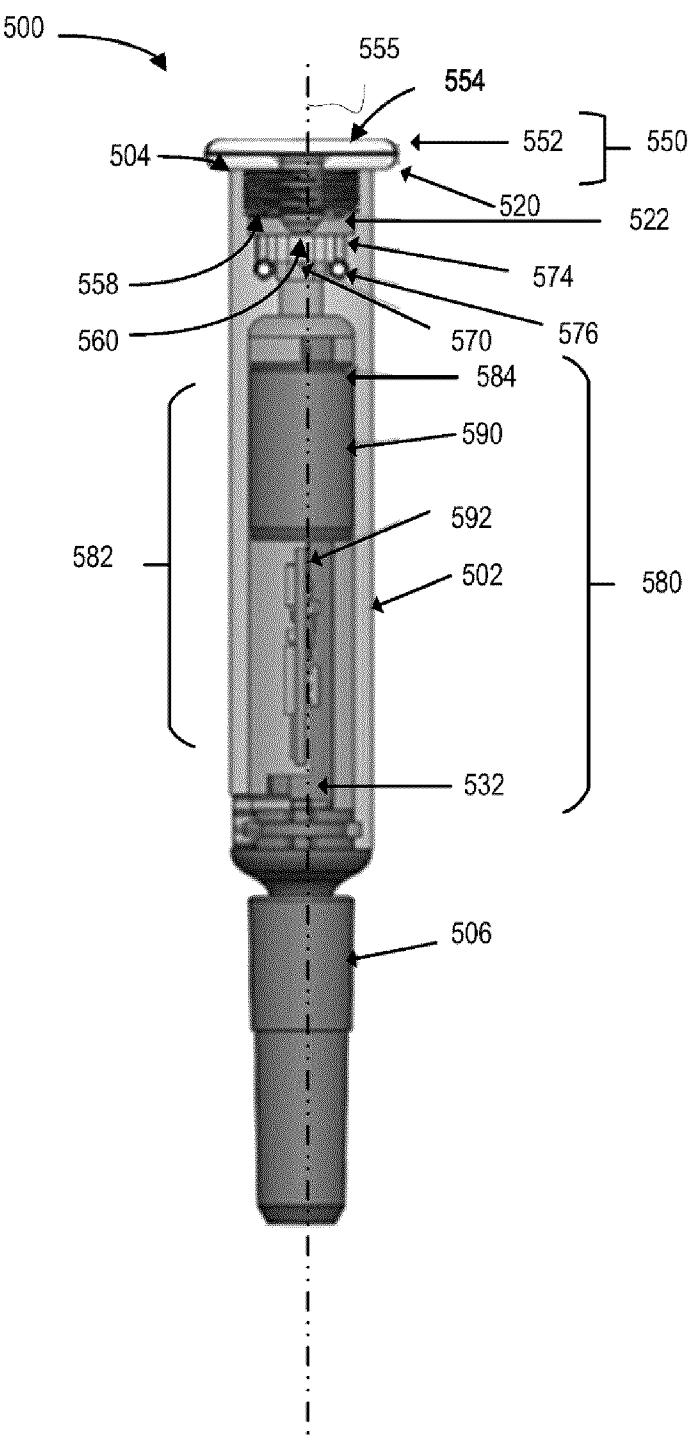
FIG. 5E is a transparent side view of the axial force measurement device shown in FIG. 5D.

Referring to FIGS. 6A-6C, there are shown examples of printed circuit board assemblies 600A-600C that may be used to provide various components of the processing system 580. FIG. 6A shows a first circuit board section 690 and a second circuit board section 692 prior to assembly. The first circuit board section 690 may be a flexible printed circuit board and the second circuit board section 692 may be a rigid printed circuit. The first circuit board 690 and the second circuit board section 690 may be assembled as shown in FIGS. 6B-6C, which show a front view of the printed circuit board assembly 600B and a back view of the printed circuit board assembly 600C, respectively. The printed circuit board assemblies 600A-600C may correspond to the processor 582 as shown in FIGS. 5C-5E. The first circuit board section 690 and the second circuit board section 692 may correspond to the first and second circuit board 590 and 592, respectively. Similar to the printed circuit board 400 of device 300, the printed circuit board 600A-600C can include a substrate, which can mechanically support and electrically connect various electrical components within the processing section 580. In some cases, the components can be provided by one or more integrated circuits (not shown) which are mounted to the substrate.

The processing system 580 may include an interface port 532 that can be connected to the processor 582. The interface port 532 can include a charging port coupled to a rechargeable battery within the device 500. The charging port can be configured to be coupled to an external power source to recharge the rechargeable battery. The interface port 532 may also include a power activation input usable to activate/deactivate/reset the device 500. For example, a toggle switch may provide the power activation input. Optionally, the interface port 532 may include a visual output device, such as an LED.

Figure 7:
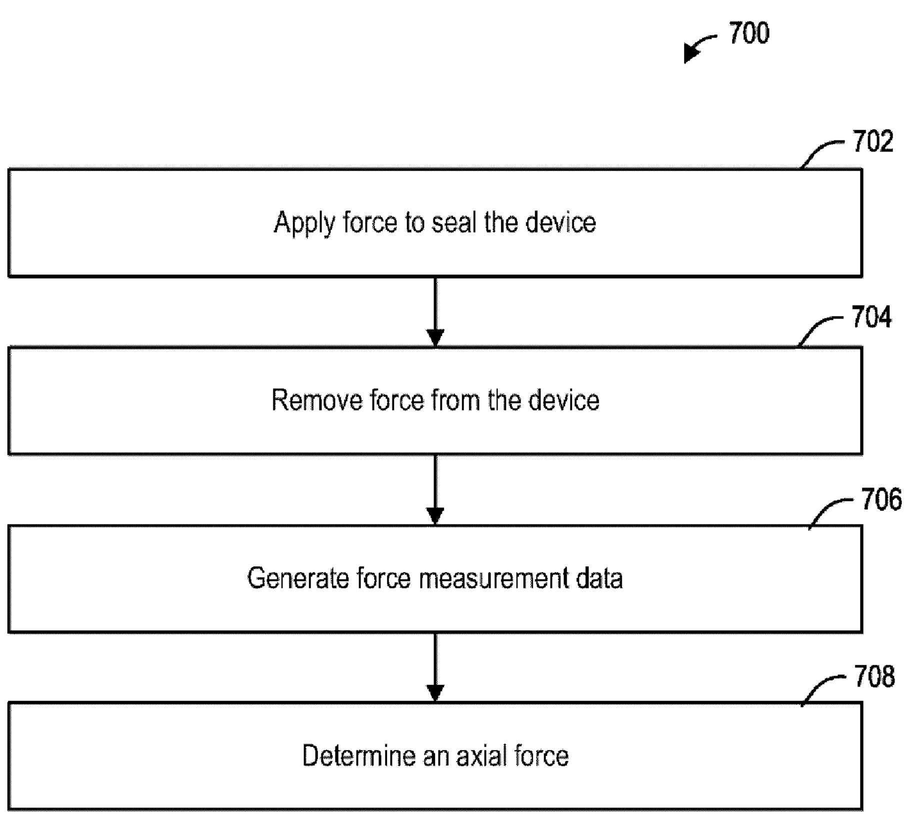
FIG. 7 is a flowchart of an example method for measuring axial forces in accordance with an embodiment.

Referring to FIG. 7, there is shown a flowchart of an example method 700 for measuring axial forces. The method 700 may be implemented using various types of axial force measurement devices, such as the example axial force measurement devices 102, 200, 300, and 500 shown and described herein.

At 702, a force can be applied on the axial force measurement device to seal the device. For example, referring to FIGS. 3A-D, a crimping force can be applied to the flange assembly 350 of the axial force measurement device to for example, apply a lid closure or a crimp cap to the axial force measurement device 300 and seal the device. Similarly, a force can be applied to the first end 354 of the closing member 352 to apply a crimp cap to the device 300.

At 704, the sealing force can be removed from the axial force measurement device. For example, the piece of equipment used to apply the force applied at 702 can be lifted once the capping process is completed, leaving a cap on the container.

At 706, the axial force measurement device can generate force measurement data. The force measurement sensor can be configured to detect residual axial forces applied to the device by the cap once the capping process is completed. The force measurement sensor can also be configured to detect axial forces applied to the device during the crimping process. The sensor may generate force measurement data in response to the axial forces.

For example, the axial force measurement device can generate force measurement in response to the sealing of the axial force measurement device. The sealing of the device can apply various axial forces to the device, which can be measured as force measurement data. For example, during capping of the axial force measurement device, a portion of capping machine will come into contact with the axial force measurement device. The axial force measurement device can measure the force applied by the capping machine coming into contact with the flange assembly of the axial force measurement device and the residual force applied by the cap installed by the capping machine on the axial force measurement device, and in particular, to the flange assembly and/or the closing member of the device. The axial force measurement device can also measure the residual force applied by the cap onto the container, once the capping machine has been removed.

At 708, an axial force can be determined. The axial force can correspond to a residual axial force exerted by the cap applied by the capping machine onto the device once the capping process is completed. The axial force can be determined based on the force measurement data. In some cases, the axial force measurement device can determine the axial force, for example, using a local processor. Alternately or in addition, the force measurement data can be transmitted to an analysis system, which can determine the axial force. Determining the axial force may, in some embodiments, involve calibrating the force measurement data based on one or more parameters specific to the axial force measurement device. By determining the force exerted by the cap, it is possible to determine if safe forces are applied to the container. Monitoring residual axial forces can also help in determining if a cap has been compromised.

Figure 8:
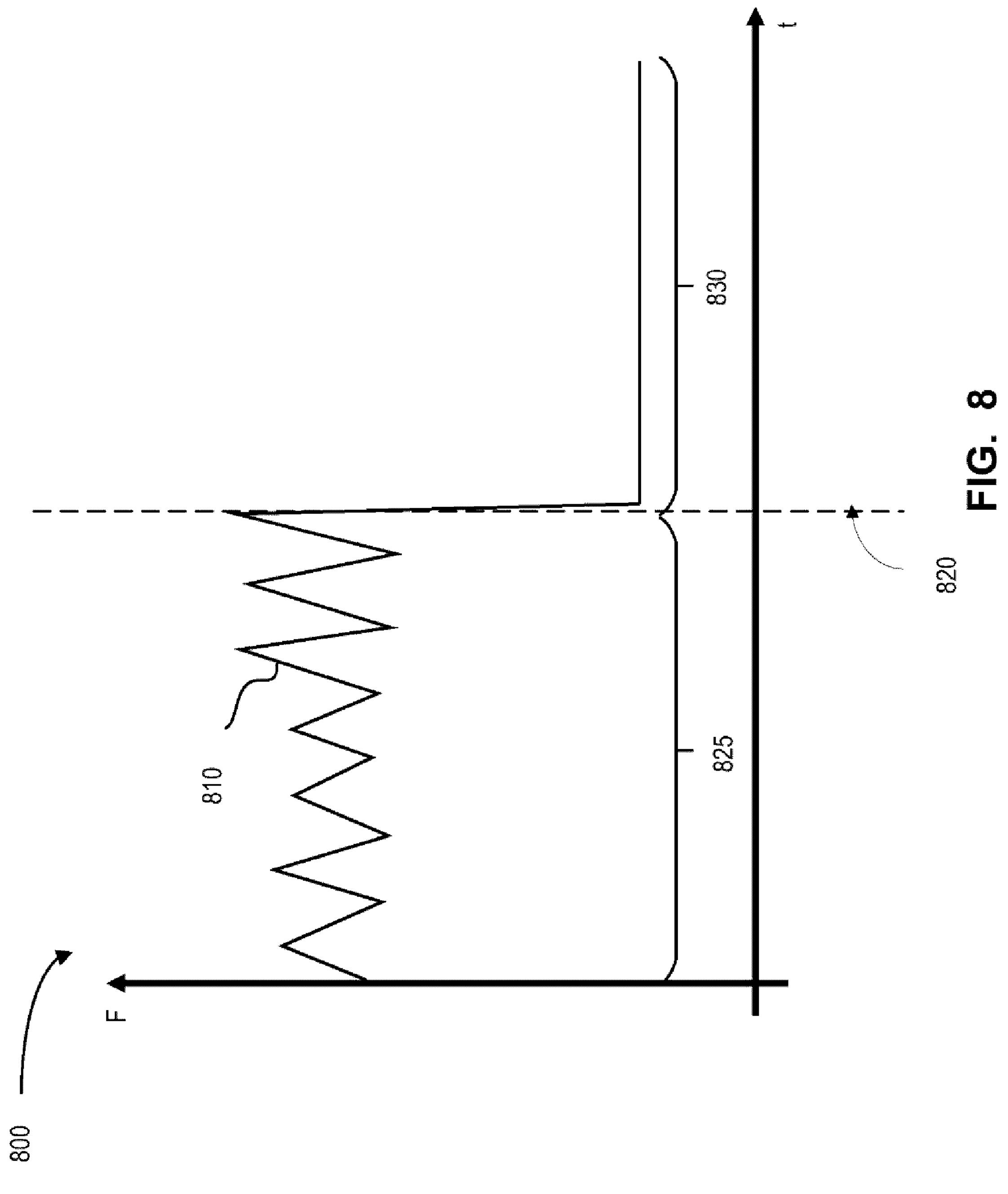
FIG. 8 is a plot of the force measured by the axial force measurement device.

Referring to FIG. 8, there is shown an example plot 800 of axial forces 810 measured by the axial force measurement device as a function of time. The plot 800 shows time on the x-axis and axial force on the y-axis. The force measured during the first time period 825 can correspond to forces measured by the axial force measurement device during the capping process, for example, as described at 702. Time marker 820 corresponds to an instance of time at which the external force is removed from the axial force measurement device, for example, as described at 704. The force measured during the second time period 830 can correspond to forces measured by the axial force measurement device once the sealing force has been removed, leaving only residual forces.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A device for detecting residual axial forces applied to a container, the device comprising:

a device housing extending between a first housing end and a second housing end along a longitudinal axis, the device housing having an inner housing wall and an outer housing wall;

a capping section mounted to the housing proximate the first housing end, the capping section having a first section end, a second section end, and at least one sidewall extending between the first section end and the second section end, wherein the capping section defines an aperture proximate the first section end;

a closing member having a corresponding first member end and a second member end along a longitudinal axis, the closing member being extendible into the aperture of the capping section, wherein a flange assembly is defined when the closing member is received within the capping section;

a force measurement sensor positioned within the device housing, wherein the force measurement sensor is configured to generate force measurement data;

a biasing member coupled to the force measurement sensor, the biasing member configured to compress against the force measurement sensor when an external force is applied to the flange assembly to seal the container, the biasing member being configured to retain a static deflection upon removal of the external force, the static deflection being indicative of the residual axial forces applied to the container after removal of the external force; and a processing section positioned within the housing, the processing section comprising a processor configured to receive the force measurement data from the sensor; and a battery configured to supply electrical power to the processor, wherein the force measurement sensor is positioned to generate residual axial force measurement data acting on the container after removal of the external force applied to the flange assembly, the residual axial force measurement data being based on the static deflection and indicative of an integrity of closure of the container.

2. The device of claim 1, wherein the force measurement sensor is additionally configured to general axial force measurement data in response to the application of the external force to the flange assembly.

3. The device of claim 1, wherein the force measurement sensor is positioned proximate the first housing end.

4. The device of claim 1, wherein the force measurement sensor is positioned to deflect in response to the application of the external force applied to the flange assembly, and to generate the force measurement data in response to the deflection.

5. The device of claim 1, further comprising a retaining member configured to receive the closing member and to constrain the longitudinal motion of the closing member.

6. The device of claim 5, wherein the retaining member is fixedly secured to the capping section.

7. The device of claim 5, wherein the retaining member is fixedly secured to the housing between the inner housing wall and the capping section.

8. The device of claim 1, wherein the processor is provided by a printed circuit board, and the battery is positioned between the printed circuit board and the force measurement sensor.

9. The device of claim 1, wherein the force measurement sensor comprises a load cell.

10. The device of claim 9, wherein the load cell is a piezoresistive load cell.

11. The device of claim 9, wherein the load cell comprises a button that is configured to deflect in response to the application of the external force to the flange assembly and movement of the closing member toward the first housing end.

12. The device of claim 1, wherein the force measurement sensor comprises a strain gauge.

13. The device of claim 12, wherein the strain gauge is a piezoresistive strain gauge.

14. The device of claim 12, wherein the strain gauge comprises a strain element positioned to deform in response to the application of the external force to the flange assembly and movement of the closing member toward the first housing end.

15. The device of claim 1, wherein the aperture extends along the longitudinal axis of the capping section from the first section end to the second section end allowing the closing member to extend through.

16. A method for measuring residual axial forces applied to a container using a device, the device comprising:

a device housing extending between a first housing end and a second housing end along a longitudinal axis, the device housing having an inner housing wall and an outer housing wall;

a capping section mounted to the housing proximate the first housing end, the capping section having a first section end, a second section end, and at least one sidewall extending between the first section end and the second section end, wherein the capping section defines an aperture proximate the first section end;

a closing member having a corresponding first member end and a second member end along a longitudinal axis, the closing member being extendible into the aperture of the capping section, wherein a flange assembly is defined when the closing member is received within the capping section;

a force measurement sensor positioned within the device housing, wherein the force measurement sensor is configured to generate force measurement data;

a biasing member coupled to the force measurement sensor, the biasing member configured to compress against the force measurement sensor when an external force is applied to the flange assembly to seal the container, the biasing member being configured to retain a static deflection upon removal of the external force, the static deflection being indicative of the residual axial forces applied to the container after removal of the external force; and a processing section positioned within the housing, the processing section comprising a processor configured to receive the force measurement data from the sensor; and a battery configured to supply electrical power to the processor, wherein the force measurement sensor is positioned to generate residual axial force measurement data acting on the container after removal of the external force applied to the flange assembly, the residual axial force measurement data being based on the static deflection and indicative of an integrity of closure of the container, the method comprising:

applying a closure member to the flange assembly using external force;

generating force measurement data in response to the application of the closure member; and determining a residual axial force acting on the container using the force measurement data.

17. The method of claim 16, further comprising:

determining an axial force acting on the container using the force measurement data.

18. A device for detecting residual axial forces applied to a container, the device comprising:

a device housing extending between a first housing end and a second housing end along a longitudinal axis, the device housing having an inner housing wall and an outer housing wall, the device housing comprising a capping section proximate the first housing end, the capping section having a first section end, a second section end, and at least one sidewall extending between the first section end and the second section end, wherein the capping section defines an aperture;

a closing member having a corresponding first member end and a second member end along a longitudinal axis, the closing member being extendible into the aperture of the capping section, wherein a flange assembly is defined when the closing member is received within the capping section;

a force measurement sensor positioned within the device housing, wherein the force measurement sensor is configured to generate force measurement data; and a biasing member coupled to the force measurement sensor, the biasing member configured to compress against the force measurement sensor when an external force is applied to the flange assembly to seal the container, the biasing member being configured to retain a static deflection upon removal of the external force, the static deflection being indicative of the residual axial forces applied to the container after removal of the external force, wherein the force measurement sensor is positioned to generate residual axial force measurement data acting on the container after removal of the external force applied to the flange assembly, the residual axial force measurement data being based on the static deflection and indicative of an integrity of closure of the container.

19. The device of claim 18, further comprising:

a processing section positioned within the housing, the processing section comprising a processor configured to receive the force measurement data from the sensor; and a battery configured to supply electrical power to the processor.

20. The device of claim 18, wherein the force measurement sensor is configured to transmit force measurement data to an external processor.

* * * * *